(12) United States Patent
Abel et al.

(10) Patent No.: US 6,693,523 B1
(45) Date of Patent: Feb. 17, 2004

(54) INSTRUMENT CLUSTER FOR MOTOR VEHICLES WITH VARIABLE-COLOR DISPLAY

(75) Inventors: Heinz-Bernhard Abel, Grossostheim (DE); Heinrich Noll, Gross-Umstadt (DE)

(73) Assignee: Mannesmann VDO AG, Frankfurt (DE)

(*) Notice: Subject to any disclaimer, the term of this patent is extended or adjusted under 35 U.S.C. 154(b) by 0 days.

(21) Appl. No.: 09/648,177

(22) Filed: Aug. 25, 2000

(30) Foreign Application Priority Data

Sep. 13, 1999 (DE) .......................... 199 43 569

(51) Int. Cl.[7] ................................. G09F 9/00
(52) U.S. Cl. ............. 340/461; 340/815.43; 340/815.65; 340/815.78; 340/441
(58) Field of Search ................ 340/815.4, 815.42, 340/815.43, 815.47, 815.53, 815.65, 815.78, 461, 462, 438, 439, 441, 457; 116/284, 288

(56) References Cited

U.S. PATENT DOCUMENTS

| | | | | |
|---|---|---|---|---|
| 4,217,625 A | * | 8/1980 | Klein | 362/30 |
| 4,621,306 A | * | 11/1986 | Sell | 362/29 |
| 4,736,198 A | * | 4/1988 | Tokuyama et al. | 350/339 F |
| 4,935,850 A | * | 6/1990 | Smith, Jr. | 362/27 |
| 5,706,757 A | * | 1/1998 | Hashimoto et al. | 116/288 |
| 5,951,621 A | * | 9/1999 | Palalau et al. | 340/995 |
| 5,975,728 A | * | 11/1999 | Weyer | 362/489 |

FOREIGN PATENT DOCUMENTS

| | | |
|---|---|---|
| DE | 3904656 | 8/1990 |
| DE | 4011840 | 10/1990 |
| DE | 4031870 | 4/1992 |
| DE | 19532427 | 11/1996 |
| DE | 19755470 | 9/1998 |
| DE | 19807482 | 8/1999 |

* cited by examiner

*Primary Examiner*—Brent A. Swarthout
(74) *Attorney, Agent, or Firm*—Martin A. Farber

(57) ABSTRACT

In an instrument cluster for motor vehicles with a variable-color display, with which at least two different measured variables and/or operating states of the motor vehicle can be represented in analog and/or digital form, when a value of a measured variable is overshot or a certain operating state of the motor vehicle is entered, the color and/or brightness of representation of more than one measured value displayed and/or operating state displayed are changed.

30 Claims, 2 Drawing Sheets

INSTRUMENT CLUSTER FOR MOTOR VEHICLES WITH VARIABLE-COLOR DISPLAY

FIELD AND BACKGROUND OF THE INVENTION

The invention relates to an instrument cluster for motor vehicles with a variable-color display. It is known from the prior art for the representation of measured values to change the color of the representation of the measured values in certain measuring ranges. For example, it is known in the case of illuminable pointers of analog displays to change the color of the pointer illumination in dependence on the measured value to be represented. It is also known to simulate analog and/or digital displays by means of colored liquid crystal displays. In this case, the colors of representation can be set by the user of the motor vehicle according to his wishes.

In particular during daytime, a change in color of an illuminated pointer or color LC display is difficult to perceive if the driver is concentrating on the traffic situation, unless the driver continually monitors the instruments present or represented on the LC display. However, continual monitoring would excessively distract the driver from the traffic situation. Or else important information would not be detected by the driver or would be detected too late.

SUMMARY OF THE INVENTION

The object of the invention is therefore to improve the perceptibility of changes of variable-color displays, in particular when entering operational states that are critical for the operation of the vehicle.

This object is achieved according to the invention by the color and/or brightness of the display of more than one measured value being changed when a value of a measured variable is overshot or undershot and/or when a certain operating state of the motor vehicle is entered. This change can be better perceived by the driver.

It is particularly advantageous to change the color representation of the entire display, since the driver notices this even when glancing at the instrument cluster and it draws the driver's attention to the display.

By making it possible to set the colors and/or brightness of the display, the driver can adapt the display according to his taste and physical capabilities.

The value concerned can be perceived particularly easily by the driver if the corresponding display or parts of the display either flash(es), keep(s) changing color or is/are represented in a color not otherwise present on the display.

In the case of a variable-color display, cruise control marks can also be easily represented. If unauthorized speed ranges for the road being driven along at the time are transmitted to the vehicle via telematic systems, the driver is always informed of the authorized speed by these ranges being highlighted in color on a speed display.

By combination with a cruise control, the cruise control can then advantageously not be set to a prohibited speed value.

By adaptation of the brightness of a color displayed according to its perceptibly for the human eye, a uniformly bright display can be achieved, if for example changes in brightness are being used only for certain warning indications.

Changing of colors can be realized in a particularly simple way by one or more color displays. A color display can be realized in a particularly space-saving way as a liquid crystal display (LC display).

In the case of a display with at least one analog display with a measuring mechanism, pointer and dial, the change in color of the pointer and/or dial may be brought about by changing the illuminating color. In this case, the pointer can be illuminated particularly easily if it and its pointer spindle are produced from light-conducting material and the variable-color light is launched into the pointer spindle at the end of the pointer spindle remote from the pointer.

If the dial in the case of an analog display with a measuring mechanism and pointer is designed in the form of a color LC display, this display may be used either for the display of the same measured value in different units (for example kilometers per hour or miles per hour) or different measured values, if the measuring mechanism is then correspondingly activated.

BRIEF DESCRIPTION OF THE DRAWINGS

The invention is explained in more detail below with reference to the figures of the drawings, in which.

DETAILED DESCRIPTION OF THE PREFERRED EMBODIMENT

Figure 1:
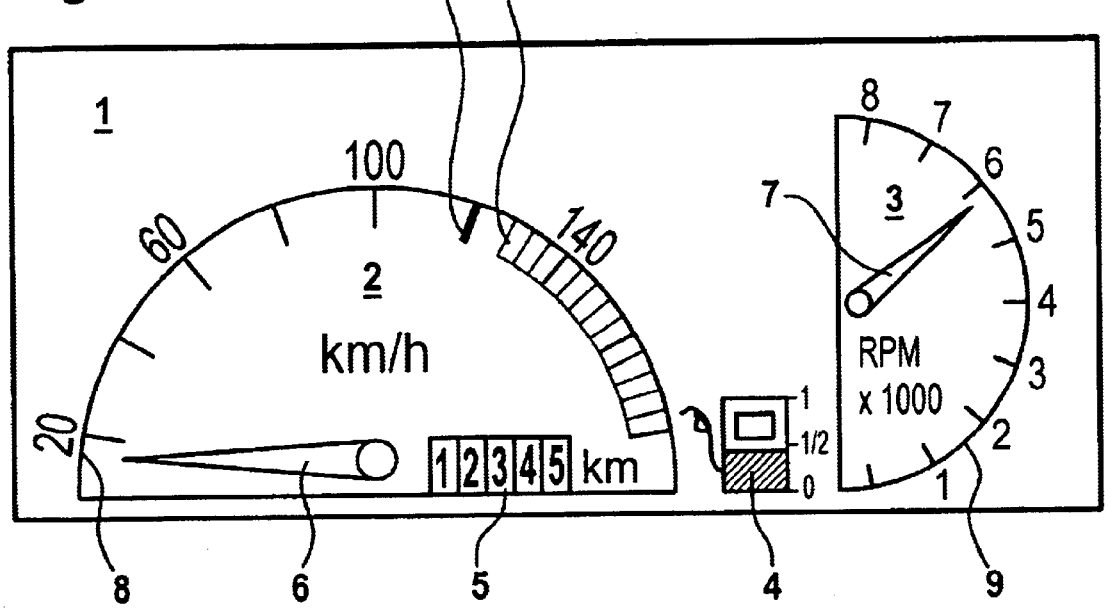
FIG. 1 shows an LC display with the representation of a number of indications.

In FIG. 1, a color LC display 1 presents analog displays 2, 3, 4 and a digital display 5. The analog display 2 represents a speedometer for indicating speeds traveled by the motor vehicle in kilometers per hour, the analog display 3 indicates the engine speed of the motor vehicle, the analog display 4 indicates the content of the fuel tank of the motor vehicle and the digital display 5 indicates the distance in kilometers covered by the motor vehicle. The analog displays 2, 3 in each case have a pointer 6, 7, represented by means of the LC display, and dials 8, 9. In the analog display 2, a cruise control mark 10 has been set. Furthermore, the vehicle driver detects the maximum speed allowed at the time on the section of road being driven along at the time by a change in the color of the dial as from the region H. If the vehicle driver switches off the cruise control and exceeds the authorized maximum speed on the section driven along at the time, the color of representation of the pointer 6 changes for example from white or green to red. At the same time, the color of the dials 8, 9 is changed. In this way, the driver's attention is aroused and, when he looks at the speedometer 2, he detects from the change in color of the pointer 6 that he is traveling too fast.

If the amount of fuel in the tank goes below a particular amount, the display 4 for example may change its color continuously and at the same time the color of the dials 8 and/or 9 may be changed.

Figure 2:
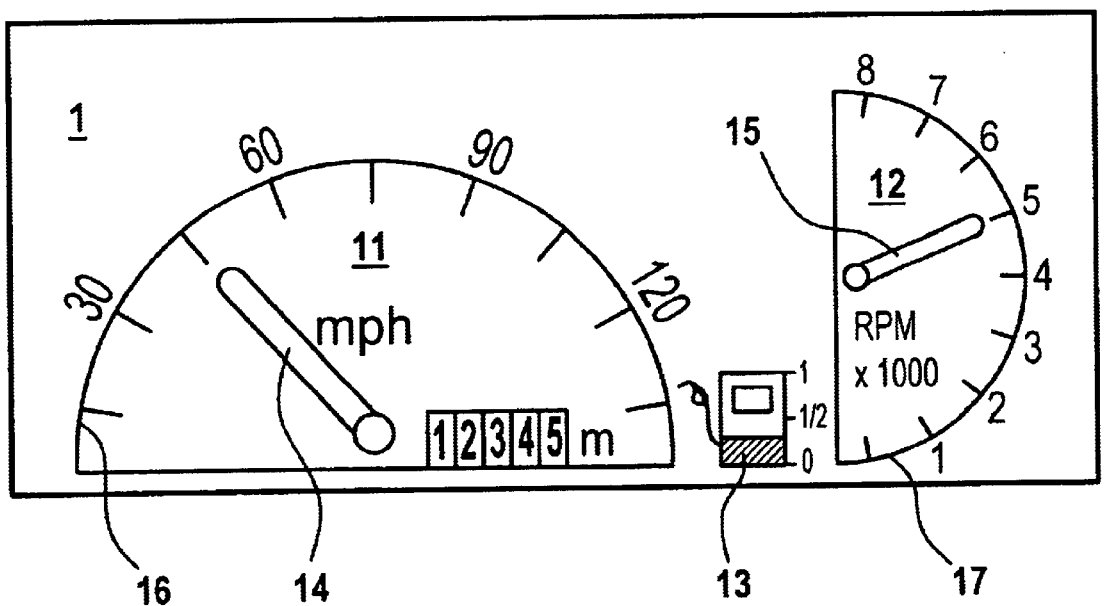
FIG. 2 shows the LC display from FIG. 1 with a changed representation of indications.

In FIG. 2, three analog displays 11, 12 and 13 are likewise presented on the LC display 1. The displays 11, 12 have pointers 14, 15 and dials 16, 17. The display 11 represents a speedometer and the display 12 a revolution counter. The speed of the motor vehicle is presented on the speedometer 11 in miles per hour. Furthermore, the form of representation of the displays 14, 15 has been changed by the vehicle driver in comparison with the displays 6, 7.

Figure 3:
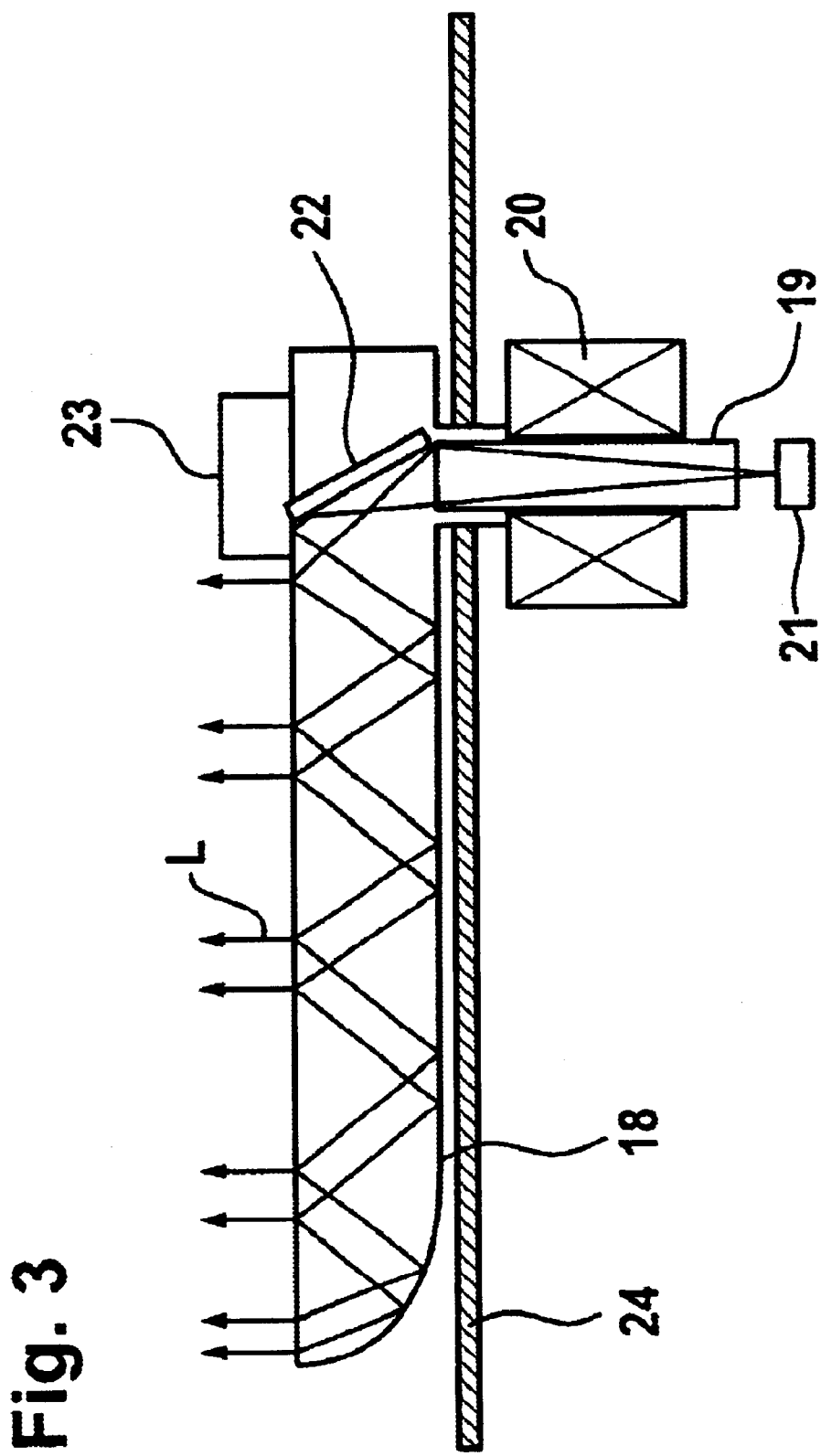
FIG. 3 shows the section through an analog display with a measuring mechanism and pointer.

In FIG. 3 there can be seen a pointer 18, which is mounted such that, by means of a pointer spindle 19, it can be rotated by means of a measuring mechanism 20 about the axis of the pointer spindle 19. The pointer 18 and the pointer spindle 19 are produced from a non-conducting material, so that light from a variable-color light source 21 can be launched into the pointer spindle 19 and passes via a deflecting mirror 22 into the pointer 18, which then transmits rays of light, as represented by rays of light L. A pointer cap 23 improves the aesthetic impression for the viewer. The pointer 18 moves over a dial 24, which is realized either by a dial printed on in a conventional way, which can shine in different colors by differently colored illumination and/or transillumination, or else can be a color LC display. The driver can then freely select which measured value is to be indicated by the pointer 18. The measuring mechanism 20 must then be activated correspondingly and the LC display 24 must present the corresponding dial. Here, too, the driver can then also select the color of the dial and of the pointer and the size and shape of the figures and letters represented on the dial.

We claim:

1. An instrument cluster for a motor vehicle, comprising a variable-color display having at least two different indicators of unique vehicular operational variables or operating states, each variable or state measured by distinct measuring means and wherein operating states of the motor vehicle are representable in at least one of analog and digital form, wherein, when a value of a measured variable presented by one of said indicators is overshot or undershot or a certain operating state of the motor vehicle is entered, at least one of color and brightness of representation of measured unique vehicular operational variables or operating states of a plurality of the indicators are changed.

2. A method for indicating at least two different ones of operating states and measured variables, in an instrument cluster of a motor vehicle, comprising the steps of:
   by use of at least two different indicators, representing in a variable-color display at least two of different unique vehicular operational variables and operating states of the motor vehicle, each variable and state measured by distinct measuring means in at least one of analog and digital form, and
   in a plurality of said indicators, changing, when a value of a measured variable is overshot or undershot or a certain operating state of the motor vehicle is entered, at least one of color and brightness of representation of more than one of the at least two displayed indicators of unique vehicular operational variables and operating states.

3. An instrument cluster for a motor vehicle, comprising a variable-color display wherein at least two different ones of unique vehicular operational variables and operating states of the motor vehicle, each variable and state measured by distinct measuring means, are representable in at least one of analog and digital form, wherein, when a value of a measured variable is overshot or undershot or a certain operating state of the motor vehicle is entered, at least one of color and brightness of representation of more than one of at least two displayed unique vehicular operational variables and operating states are changed.

4. The instrument cluster of claim 3, wherein one of the at least two displayed measured values and operating states which are changed in at least one of color and brightness displays the overshot or undershot measured variable or entered operating state.

5. The instrument cluster as claimed in claim 4, wherein display of the overshot or undershot measured variable or entered operating state is represented by at least one of a constantly changing color and brightness.

6. The instrument cluster as claimed in claim 3, wherein, when a value of the measured variable is overshot or undershot or if a certain operating state of the motor vehicle is entered, at least one of the color and brightness of representation of the entire instrument panel are changed.

7. The instrument cluster as claimed in claim 3, wherein, when there is a change in color, brightness of the changed color is adapted in dependency on perceptibility.

8. The instrument cluster as claimed in claim 3, further comprising one or more color displays for representing at least one of digital values, symbols and analog display instruments.

9. The instrument cluster as claimed in claim 8, wherein the one or more color displays are color LC displays.

10. The instrument cluster as claimed in claim 3, further comprising at least one analog display instrument with a measuring mechanism (20), pointer (18) and dial (24), wherein the pointer and dial (24) are illuminable in different colors.

11. The instrument cluster as claimed in claim 10, wherein the dial (24) is a color LC display.

12. The instrument cluster as claimed in claim 11, wherein different dials are selectable by a driver of the vehicle.

13. The instrument cluster as claimed in claim 10, wherein the pointer (18) is illuminable with a variable-color light source (21), said light source launches its light through a light-conducting pointer spindle (19) into the pointer (18).

14. The instrument cluster as claimed in claim 10, wherein basic colors of dials and pointers are settable by a driver of the vehicle.

15. The instrument cluster as claimed in claim 10, wherein color transitions in response to changing measured values to be displayed are freely settable.

16. The instrument cluster as claimed in claim 3, wherein, with a speed display, an unauthorized speed range is representable by being highlighted in color, and wherein cruise control marks (10) cannot be set in an unauthorized speed range.

17. An instrument cluster for a motor vehicle, comprising a variable-color display including at least two different subdisplays, each of said at least two subdisplays representing respective unique vehicular operational variables and operating states of the motor vehicle, each variable and state measured by distinct measuring means, in at least one of analog and digital form, wherein, when a value of a measured variable is overshot or undershot or a certain operating state of the motor vehicle is entered, at least one of color and brightness of representation of at least two of the subdisplays are changed, the at least two subdisplays displaying unique vehicular operational variables or operating states.

18. The instrument cluster of claim 17, wherein at least one of the subdisplays which are changed in at least one of color and brightness displays the overshot or undershot measured variable or entered operating state.

19. The instrument cluster as claimed in claim 17, wherein, when a value of the measured variable is overshot or undershot or if a certain operating state of the motor vehicle is entered, at least one of the color and brightness of representation of the entire instrument panel are changed.

20. The instrument cluster as claimed in claim 17, wherein the measured variables, the value of the latter which has been overshot or undershot or the particular operating state of the motor vehicle is represented by at least one of a constantly changing color and brightness.

21. The instrument cluster as claimed in claim 17, wherein, when there is a change in color, brightness of the changed color is adapted in dependency on perceptibility.

22. The instrument cluster as claimed in claim 17, further comprising one or more color subdisplays for representing at least one of digital values, symbols and analog display instruments.

23. The instrument cluster as claimed in claim 22, wherein the one or more color subdisplays are color LC displays.

24. The instrument cluster as claimed in claim 17, wherein at least one subdisplay is an analog display instrument with a measuring mechanism (20), pointer (18) and dial (24), wherein the pointer and dial (24) are illuminable in different colors.

25. The instrument cluster as claimed in claim 24, wherein the dial (24) is a color LC display.

26. The instrument cluster as claimed in claim 24, wherein different dials are selectable by a driver of the vehicle.

27. The instrument cluster as claimed in claim 24, wherein the pointer (18) is illuminable with a variable-color light source (21), said light source launches its light through a light-conducting pointer spindle (19) into the pointer (18).

28. The instrument cluster as claimed in claim 24, wherein basic colors of dials and pointers are settable by a driver of the vehicle.

29. The instrument cluster as claimed in claim 28, wherein color transitions in response to changing measured values to be displayed are freely settable.

30. The instrument cluster as claimed in claim 17, wherein, with subdisplay measuring a speed, an unauthorized speed range is representable by being highlighted in color, and wherein cruise control marks (10) cannot be set in an unauthorized speed range.

\* \* \* \* \*